July 1, 1969  H. A. JOHNSON, SR  3,452,475
SELF-IRRIGATED PLANTER
Filed June 30, 1967

INVENTOR.
HUGH A. JOHNSON, SR,
BY
Berman, Davidson & Berman
ATTORNEYS.

United States Patent Office 3,452,475
Patented July 1, 1969

3,452,475
SELF-IRRIGATED PLANTER
Hugh A. Johnson, Sr., 114 3rd St., Box 125,
Lakeview, Mich. 48850
Filed June 30, 1967, Ser. No. 650,289
Int. Cl. A01g 27/00, 9/02
U.S. Cl. 47—38          10 Claims

ABSTRACT OF THE DISCLOSURE

A vertically-tiered self-irrigated planter consisting of a base pan with a central vertical upstanding tubular post. The post is apertured at its bottom end so as to communicate with the pan. A water-supply conduit provided with a float valve extends radially through the pan into the post, and upwardly through the post, terminating in a sprinkler head above the top end of the post and having an outlet conduit at said top end provided with a manually-operated control valve. A series of vertically-stacked trays surround the post, the trays having peripheral annular troughs containing soil for plants. The trays have respective annular water chambers inwardly of the soil troughs, the water chambers and the soil troughs being in communication with each other at their lower end portions. Also, overflow apertures are provided in the upper portions of the walls between the water chambers and the soil troughs. Water is admitted from the top end of the water-supply conduit through a screen provided on the uppermost water chamber. The outer walls of the soil troughs are upwardly-flared and overlie each other. These outer walls are provided with overflow apertures at their upper potrions, allowing excess water to drip from the upper troughs to the lower troughs and thence to the base pan. Upwardly and outwardly-inclined air vent tubes are connected to the lower portion of the tubular post.

---

This invention relates to a self-irrigated vertically-tiered sectional planter. A main object of the invention is to provide a novel and improved self-irrigated, multiple-tier planter which is relatively simple in construction, which provides automatic irrigation of plants contained therein, which is relatively compact in size, and which is neat in appearance.

A further object of the invention is to provide an improved vertically-tiered self-irrigating planter which is inexpensive to manufacture, which is durable in construction, which is easy to clean, and which involves a minimum number of parts.

A still further object of the invention is to provide a vertically-tiered self-irrigating planter which includes means for properly controlling the supply of water to the soil troughs thereof, which provides maximum exposure to light of the plants contained in the soil troughs thereof, and which allows plants to be properly nourished and to grow in a relatively small amount of space and without interfering with each other.

Further objects and advantages of the invention will become apparent from the following description and claims, and from the accompanying drawing, wherein:

Figure 1:
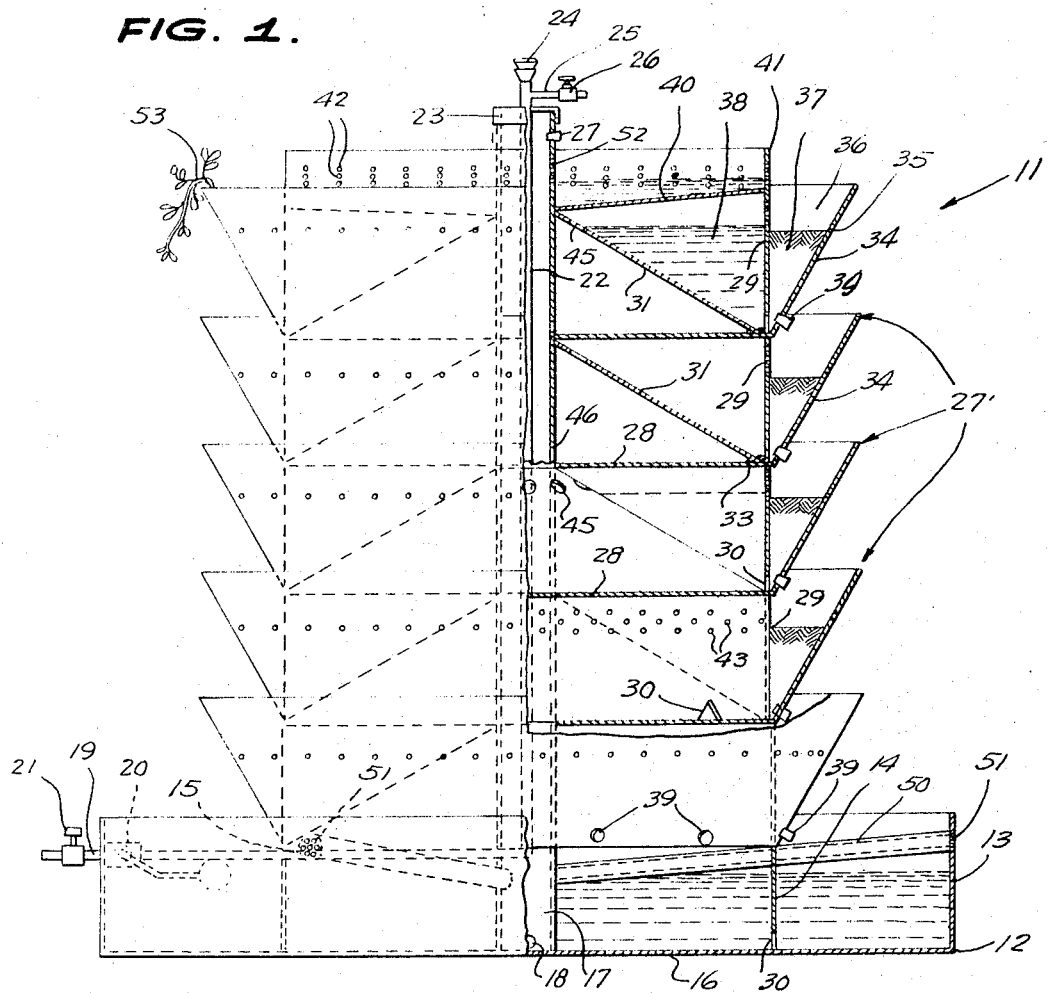
FIGURE 1 is a front elevational view, partly in vertical cross-section, of an improved multiple-tiered, self-irrigating planter constructed in accordance with the present invention.
Figure 2:
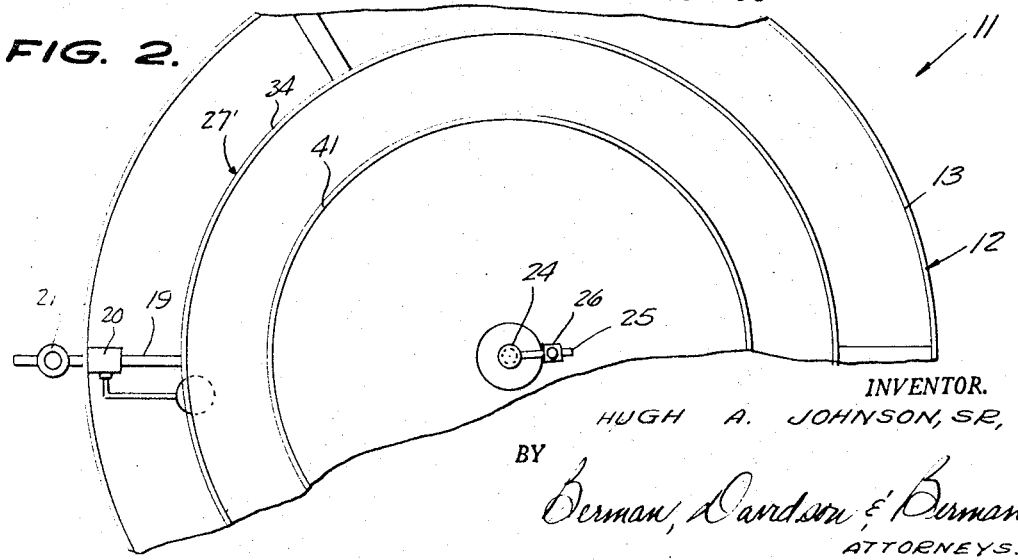
FIGURE 2 is a fragmentary top plan view of the planter shown in FIGURE 1.

Referring to the drawing, 11 generally designates an improved self-irrigating planter constructed in accordance with the present invention. The planter 11 comprises a generally circular base pan 12 having a peripheral vertical wall 13 and provided with an upstanding concentric inner wall 14 of lesser height than the outer wall 13, the top edge 15 of inner wall 14 being spaced a short distance below the top plane of the top edge of outer wall 13.

Rigidly-secured to the center portion of the bottom wall 16 of base pan 12 is the upstanding vertical tubular post 17, the lower end portion of post 17 being provided with apertures 18 to place it in communication with the central inner portion of pan 12, namely, the portion enclosed by the inner wall 14.

Designated at 19 is a water-supply conduit which extends radially through the pan 12, being provided inwardly-adjacent wall 13 with a float valve 20 and being provided externally-adjacent wall 13 with a manually-controlled valve 21. Conduit 19 extends into tubular post 17 and thence upwardly, as shown at 22, extending upwardly through a top cover cap 23 provided on the top end of post 17. A sprinkler head 24 is provided on the top end of the vertical conduit portion 22, and below said sprinkler head the upper portion of the conduit is provided with a horizontal outlet conduit 25 having a manually-controlled valve 26.

The top portion of post member 17 is provided with vent apertures which are normally covered by removable plugs 27.

Stacked above each other and secured centrally to the vertical post member 17 and surrounding same are a plurality of trays 27', each tray comprising a circular horizontal bottom wall 28 which is secured on the top edge of a generally cylindrical inner wall element 29 concentrically-secured in the subjacent tray 27'. Thus, the lowermost tray 27' is supported on and secured to the top edge of the member 14, and the succeeding trays 27' are secured to and supported on the top edges of the inner wall members 29 of the successive trays. Each of the members 14 and 20 is provided at their lower portions with notches or openings 30.

Each of the trays 27' is provided with the upwardly-convergent, frusto-conical inner portion 31 rigidly-secured at its outer edge in the corner defined between the bottom wall 28 and the cylindrical wall element 29 of the associated tray, as shown at 33 in FIGURE 1.

The members 31 are secured at their upper inner edges to the post element 17.

The trays are provided with upwardly-flaring outer wall portions 34 which overlie each other, said wall portions having overflow apertures 35 at their upper portions to allow water to drip from an upper compartment 36, shown in FIGURE 1, to the next lower compartment in a manner presently to be described. The peripheral annular compartments, shown at 36, are defined between the outer walls 34 and the substantially cylindrical annular wall elements 29. These compartments are adapted to receive respective quantities of soil 37 in which plants are to be nourished.

Respective water compartments 38 are defined between the frusto-conical members 31 and the generally cylindrical members 29. A downwardly-convergent screen 40 is secured around the post member 17 at the apex of the uppermost member 31, being secured at its outer edge to the top edge of the uppermost member 29. An apertured upstanding annular wall member 41 is secured on the top edge of the uppermost member 29, defining a water-receiving compartment with the screen 40 as its lower wall. As shown in FIGURE 1, this compartment is in a position to receive water either from the conduit 25 when valve 26 is opened, or from the sprinkler head 24. The apertures in the wall 41, as shown at 42, are spaced above and are adjacent to the upper portion of the uppermost soil trough 36.

The wall members 29 are provided with overflow apertures 43 at their upper portions, allowing water to flow therein from the upper portions of the soil troughs 36 and allowing excess water from the soil compartments 36 to accumulate in the water compartments 38. Overflow apertures 45 are provided at the upper inner portions of the walls 31. The post member 17 is provided with drain apertures 46 adjacent the bottom walls 28 of the respective trays 27'.

The outer wall elements 34 are provided at their lower portions with drain apertures which are normally covered by drain plugs 39 which may be easily removed when it is desired to drain the moisture out of the respective soil troughs 36.

Connected to and communicating with the lower portion of the central post member 17 are a plurality of outwardly-extending upwardly-inclined vent conduits 50 terminating at apertured portions 51 at the upper margin of outer wall 13 of the base pan 12.

The post member 17 is provided with upper overflow apertures 52 substantially at the level of the uppermost apertures 42 to allow overflow as required into post member 17 from the space above screen 40.

The soil troughs 36 are employed to nourish plants 53, and in operation of the device, with valve 21 opened, water flows into the pan 12, being admitted to a height determined by the action of the float valve 20. With float valve 20 open, the water enters conduit 19, passing upwardly through the vertical conduit portion 22 and discharging from sprinkler head 24 and from conduit 25 if valve 26 is opened. The water flows through apertures 42 into the uppermost soil trough 36, accumulating in the water-supply space 38 to a level up to the overflow apertures 45, and then passing into the subjacent space below the frusto-conical wall 31. The water also overflows through the apertures 35 into the next subjacent tray 27', entering the soil trough portion 36 thereof. Water accumulates in the water space 38 of the next subjacent tray and the action is substantially the same as above-described with respect to the uppermost tray 27', the excess water moving downwardly to the next subjacent tray and also downwardly through the tubular central post member 17. In this manner, a desired level of water is mantaned in the various water compartments 38, the excess water ultimately dropping down into the base pan 12 either by the flow thereof through the overflow apertures 35 of the lowermost tray 27' or by the drainage through the apertures 46 in the central post member, being thus transmitted into the base pan 12 through the bottom apertures 18 of the post member. When a desirable predetermined level of water exists in the base pan 12, the float valve 20 closes, shutting off the supply of water until it drops below the desired level. In this manner, the desired level of water is maintained in the various water compartments 38, thus maintaining the desired irrigation of the soil 37 in the respective soil troughs 36.

The planter 11 may be used in any convenient location affording proper exposure to light and having access to a suitable supply of water. The water supply may include liquid fertilizer, or the fertilizer may be introduced in any other suitable form, for example, may be introduced in powdered form by placing it on the top screen member 40 so that it can be washed into the planter by the spray emerging from the head 24 or by the water admitted through conduit 25 by opening valve 26.

It will be noted that the substantially cylindrical upstanding inner walls 29 are of lesser height than the outer peripheral walls 34, substantially to the same degree that the inner upstanding wall element 14 is of lesser height than the outer peripheral wall element 13 of the pan 12, whereby the lower portions of the trays 27' are located below the plane of the top edges of the subjacent upwardly-flaring peripheral walls 34. Thus, the trays 27' are substantially nestingly-received relative to each other, with the lowermost tray member 27' received in the base pan 12, as is clearly illustrated in FIGURE 1.

While a specific embodiment of an improved multiple-tiered planter has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A planter comprising a pan-shaped base, an upstanding tubular post member secured in said base and being open at its lower end portion to the interior of said base, a plurality of vertically-stacked trays secured around said tubular post member, said trays having upwardly-flaring peripheral walls substantially in vertical registry with each other and overlying the pan-shaped base, respective inner upstanding walls in the trays defining a peripheral soil compartment for each tray, respective upwardly-convergent walls in the trays defining a liquid compartment inwardly-adjacent each soil compartment, the upstanding walls being apertured at their lower portions to establish communication between the lower ends of the liquid and soil compartments, the inner upstanding walls and the upwardly-convergent walls having overflow apertures at their upper portions, the upwardly-flaring peripheral walls also having overflow apertures at their upper portions, said trays having imperforate bottom walls mounted on the top edges of the subjacent inner upstanding walls and defining thereabove respective inner drain compartments, said tubular post member having respective apertures communicating with the lower portions of the inner drain compartments, conduit means extending into the upper portion of the pan-shaped base and extending upwardly through the post member and terminating thereabove, discharge means on the top end of the conduit means, and level-responsive valve means in the portion of the conduit means located in the pan-shaped base.

2. The planter of claim 1, and a screen between the uppermost tray and the discharge means.

3. The planter of claim 2, and wherein said discharge means includes a sprinkler head.

4. The planter of claim 3, and wherein said discharge means also includes an outlet conduit provided with a manually-controlled valve.

5. The planter of claim 2, and an apertured upstanding peripheral wall element projecting upwardly from the periphery of said screen.

6. The planter of claim 5, and wherein said screen is inclined upwardly and outwardly from the post member to the periphery of the screen.

7. The planter of claim 2, and wherein said level-responsive valve means comprises a float-operated valve.

8. The planter of claim 7, and an upwardly and outwardly-inclined vent tube communicatively-connected to the lower end portion of the post member.

9. The planter of claim 8, and wherein said upwardly-convergent walls are substantially frusto-conical in shape.

10. The planter of claim 9, and wherein said upwardly-flaring peripheral walls are also substantially of frusto-conical shape, whereby to define substantially annular peripheral soil compartments.

References Cited

UNITED STATES PATENTS

| 297,932 | 4/1884 | Groves et al. | 47—34.12 X |
| 1,217,239 | 2/1917 | Swartz | 47—34.12 X |
| 1,752,597 | 4/1930 | Jackson | 47—34.12 |
| 3,293,798 | 12/1966 | Johnson | 47—34.12 |

FOREIGN PATENTS

| 1,105,049 | 6/1968 | Great Britain. |

ROBERT E. BAGWILL, *Primary Examiner.*

U.S. Cl. X.R.

47—34.12